Dec. 26, 1922.
W. SMITH.
WATER MOTOR.
FILED OCT. 1, 1921.
1,439,848
2 SHEETS-SHEET 2
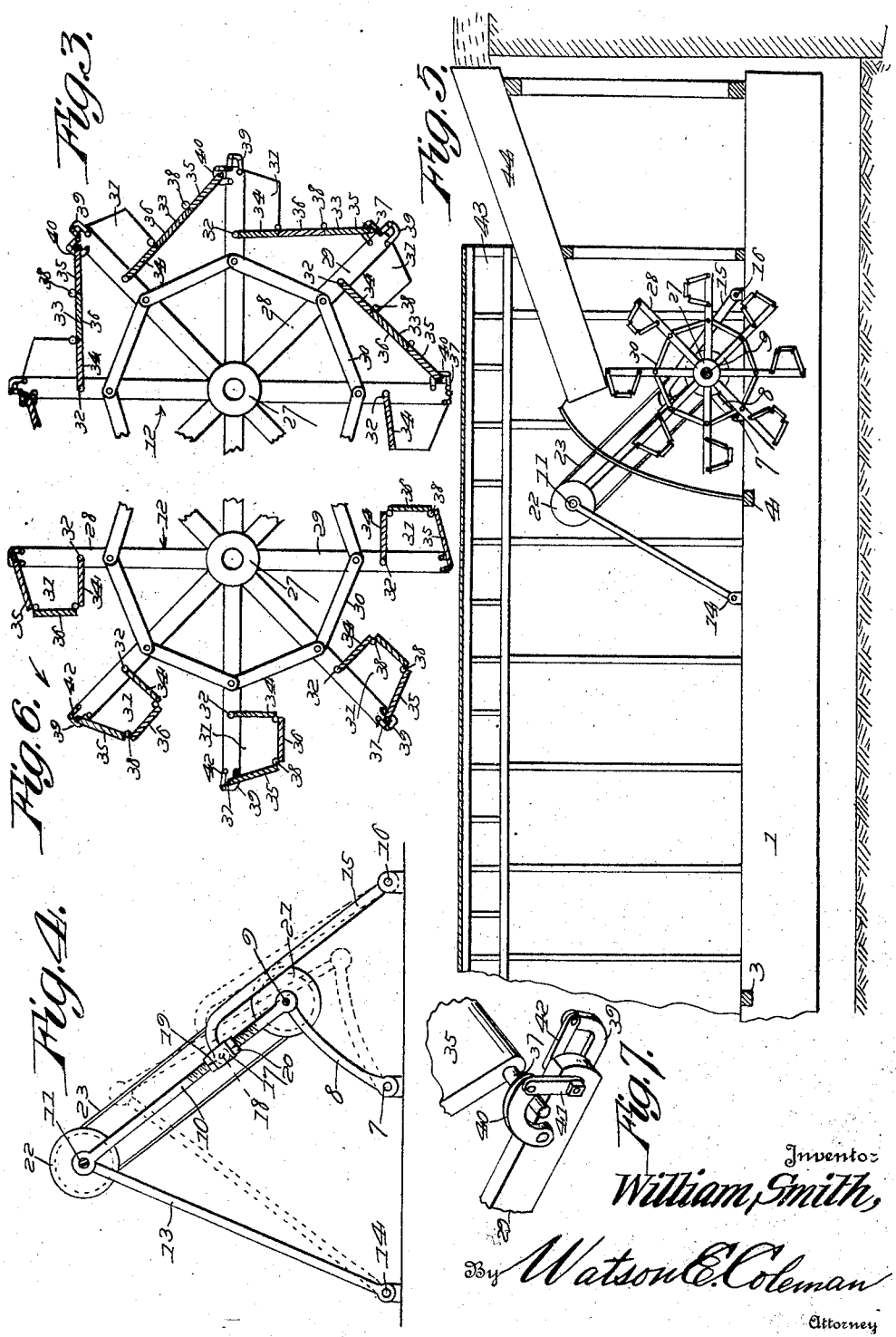
Inventor
William Smith,
By Watson E. Coleman
Attorney Patented Dec. 26, 1922.

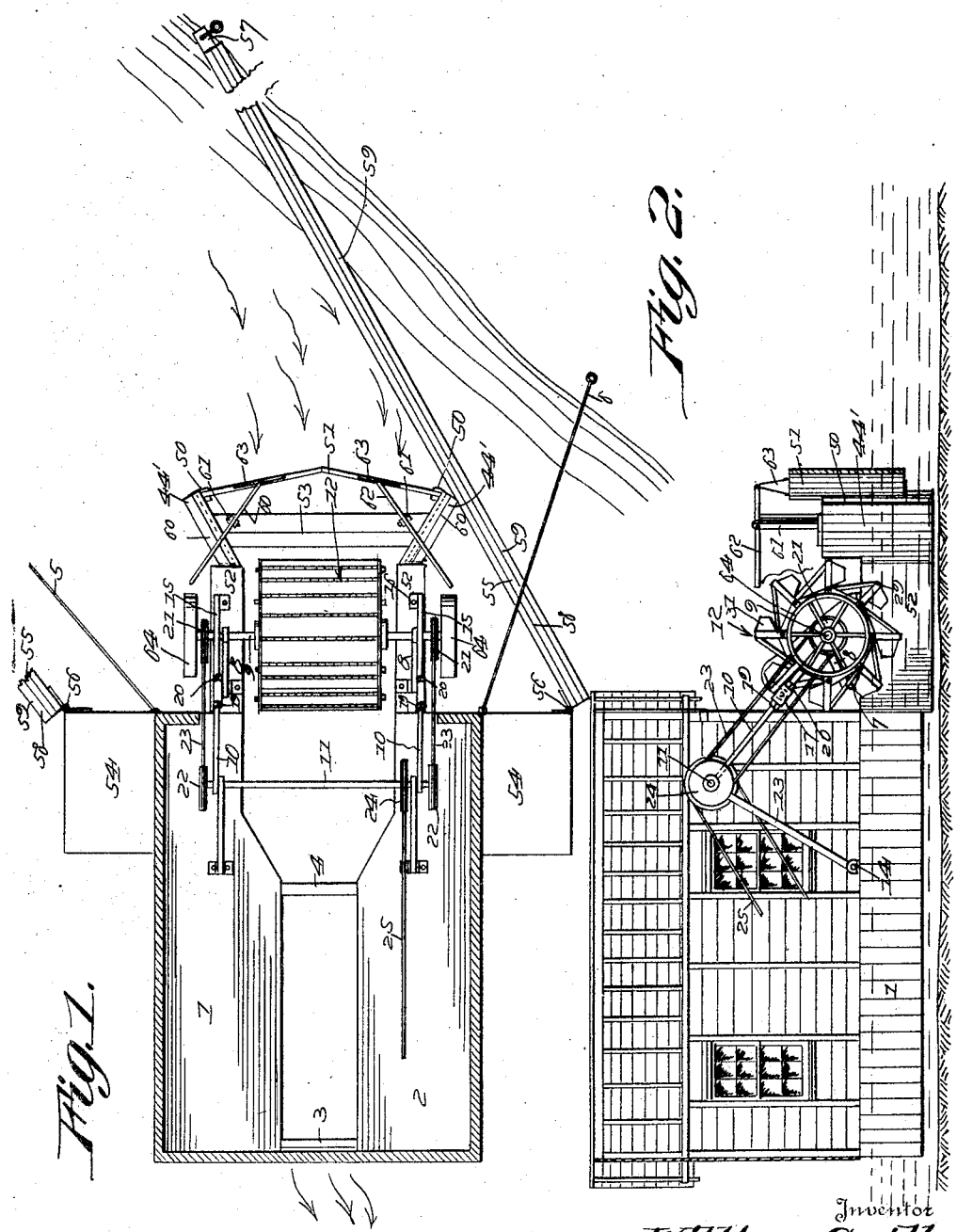

1,439,848

UNITED STATES PATENT OFFICE.

WILLIAM SMITH, OF GAINESBORO, TENNESSEE.

WATER MOTOR.

Application filed October 1, 1921. Serial No. 504,714.

*To all whom it may concern:*

Be it known that I, WILLIAM SMITH, a citizen of the United States, residing at Gainesboro, in the county of Jackson and State of Tennessee, have invented certain new and useful Improvements in Water Motors, of which the following is a specification, reference being had to the accompanying drawings.

The present invention has for its purpose to provide a motor of this kind which may be used to derive power from dams, falls, or currents either high or low.

Another purpose is to provide a water motor, wherein the wheel includes a plurality of paddles, foldable, so as to form buckets, so that the wheel may be operated by the force of water from a dam or falls, and when arranged to form paddles, the wheel may operate in a stream of water where the current is swift and adapted to impinge upon the paddles or blades.

Still another purpose is the provision of a motor of this kind, wherein a pair of floats are employed, the floats being connected together, and designed for supporting the frame, which in turn supports the power wheel, in combination with a flue or chute for directing the water to the wheel.

A further purpose consists in the provision of a water power machine of this character, wherein the power wheel, whether it be an over-shot bucket type wheel, or an under-shot paddle type wheel for water currents, may be adjusted, in order to better adapt the wheel to the level of the water, or the direction of the water.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a plan view showing the water motor arranged in a stream so that the power wheel may be operated by the current of water, showing how the power is transmitted from the shaft of the power wheel to machinery (not shown), also showing the housing in horizontal section;

Figure 2 is a view in side elevation of the machine as shown in Figure 1, showing the housing in vertical section;

Figure 3 is an enlarged detail sectional view of the water wheel or power wheel;

Figure 4 is an enlarged detail view in elevation of the means for adjustably supporting the power or water wheel;

Figure 5 is a view in elevation of the water or power wheel showing the blades thereof arranged as buckets;

Figure 6 is an enlarged detail view of the water or power wheel, showing the blades arranged to form buckets with the buckets in section; and Figure 7 is an enlarged detail perspective view of one of the hooks showing how the blades or paddles are connected to the radial arms of the water wheel.

Referring to the drawings, 1 and 2 designate a pair of floats, which are connected in any suitable manner as shown at 3 and 4, so that they may remain substantially relatively rigid. The floats may be connected to one side or the other or both banks of the stream as at 5 and 6, so that they will remain relatively fixed. Also the floats are spaced so as to provide a channel through which the stream passes. Connected to the floats as at 7 so that they may be moved or adjusted are supports 8 for the power wheel. Pivotally connected to the supports by means of a shaft 9 are links or arms 10, in bearings of the upper ends of which a shaft 11 is mounted. The shaft 9 rotatably supports the power wheel 12. Pivotally connected to the shaft 11 are braces 13, which in turn are connected at 14 to the floats. Arms 15 are pivotally mounted on the floats as at 16, and are in turn pivotally connected to the sleeves 17 as at 18. The sleeves are slidably mounted upon the arms or links 10, and are held in different positions by the nuts 19 and 20, which are threaded upon the arms 10. By adjusting the nuts 19 and 20 it is obvious that the arms 15' may be adjusted relatively to the arms 10, so that the arms 10 may be adjusted relatively to the floats, for the purpose of positioning the power wheel in lowered or raised positions, according to the level of water in the stream, or according to the direction of water from the dam or falls, so that the water may be impinged properly upon the blades or paddles, or within the buckets of the wheel.

A shaft 9 is provided with pulleys 21, which in turn are operatively connected to pulleys 22 on the shaft 11, by means of the cables or ropes 23. The shaft 11 is provided with a pulley 24, which is adapted to be operatively connected to any suitable machinery (not shown) for operating the same, by means of a cable or rope 25, whereby power may be transmitted from the water motor to the machinery to be operated. The power wheel comprises a hub portion 27, a frame 28, which consists of radial pieces 29 and the braces 30. The radial pieces have extensions 31, and pivotally connected to the pieces 29 as at 32 are paddles 33. Each paddle consists of three sections, end and intermediate sections 34, 35 and 36. The pieces 34 are pivotally connected at 32 to the radial pieces 29, while the pieces 35 have lateral extensions 37. The pieces 34, 35 and 36 are hingedly united at 38, so that they may be folded to form buckets. The outer marginal edges of the arms of the power wheel are provided with hooks 39, while the longitudinal edges of the radial pieces have hooks 40. The hooks 39 and 40 are pivotally mounted on the frame of the wheel, and are adapted to receive the lateral projections 37 of the section 35 of the paddles, it depending entirely upon whether they are used as paddles, or folded and used as buckets. As shown in Figures 1, 2 and 3 the paddles are opened, so that the lateral projections 37 engage the hooks 40, so that the current of the stream of water may impinge upon the paddles and impart revoluble movements to the wheel. In order to hold the lateral projections 37 in engagement with the hooks suitable latches 41 are bolted in position, connecting the radial pieces and the ends of the hooks.

As shown in Figure 6 the sections of the paddles are bolted, so that they will conform to the angular shape of the extensions 31. In this case the lateral projections 37 are engaged with the hooks 39, there being latches 42 connecting the frame and the ends of the hooks, thereby holding the paddles folded, in such wise as to form buckets with which the water from a dam or falls may impinge, for imparting revoluble movement to the wheel. It will be noted that when the paddles are folded as shown in Figure 6 the extensions 31 act as the end pieces of the bucket, so as to properly contain the water during its cooperation therewith.

When the water motor is arranged for streams, where it is necessary to derive the power from the current the paddles are opened, and when the water motor is arranged for receiving power from falls or dams, the paddles are arranged to form buckets. Rising upwardly from the floats is a suitable housing 43, for protecting the water wheel, and its cooperating parts.

In order to direct the water toward the paddles or into the buckets, chute walls 44', as shown in Figures 1 and 2 are provided.

In some instances the water wheel is housed as shown in Figure 5, while in other instances the water wheel is supported upon riggings projecting forwardly of the floats, thereby positioning the water wheel from under the housing, as in Figures 1 and 2.

In this latter instance the chute walls 44 have guides 50 in which the gates 51 are mounted. The chutes or water guides 44 are carried by the out-riggings 52, which support the water wheel, and are relatively reinforced by the transverse braces or boards 53. The floats 1 and 2 which support the housing have additional laterally projecting floats 54, to which buoys 55 are connected as at 56. While only one of the buoys 55 is shown as extending from one of the lateral floats 54 toward and connected to the side of the land by means of a cable 57, it is obvious that both buoys are to be similarly arranged and connected to the land. Each buoy is to be constructed of several logs, so that they break joints, and are inclined from the floats 54 toward the side of the land or embankment of the stream. Each buoy is provided with a walkway 58, and a side railing or banister 59, to permit an operator or other workman about the plant to pass from the land into the housing. Furthermore the chutes 44 also have walkways 60, whereby an operator may walk out upon the chutes, for the purpose of raising and lowering the gates 51. Rising upwardly from one of the braces 53 are suitable supports or standards 61 for the support of the levers 62 which are connected to the gates by the rods 63. The levers may be tilted in order to raise the gates. It is obvious that any other suitable means may be used for raising and lowering the gates.

It is to be understood that in case of emergency, for instance in case of high tide, any well known spring belt or brake controlled governors (not shown) may be used in connection with the drive shaft 9 and the governor fly wheels 64, in order to control the speed of the wheel. However, ordinarily the governor fly wheels 64 are sufficient.

The invention having been set forth, what is claimed as being useful is:

1. In a water motor, a float, a driving power shaft including a water wheel, supports mounted on the float and carrying said shaft, arms connected to the supports, a driven shaft mounted on the upper ends of said arms and being operatively connected to the shaft of the wheel, movable braces connected to the upper ends of said arms and in turn connected to the float, and additional braces adjustably connected to the arms, for adjusting the two shafts toward and from the float, thereby regulating the position of the water wheel relatively to the water.

2. In a water motor, a float, driving and driven shafts, means for holding said shafts connected in horizontal relative planes, means for supporting said shafts adjustably toward and from the float, whereby a water wheel on the driving shaft may assume different positions relatively to the surface of the water, and a water wheel mounted on the driving shaft.

3. In a water motor, a float, water driving means on the float including a water wheel, said wheel comprising a frame including end pieces, blades connected to the end pieces pivotally and comprising three sections and adapted to be disposed, whereby the water may impinge therewith, when the wheel is operating in a stream, for imparting motion to the wheel.

4. In a water motor, a float, a water propelled mechanism thereon including a water wheel comprising end frames, said end frame comprising radial arms, sectional blades connected to certain corresponding opposite arms by the two end frames and in turn connected to certain other of the corresponding arms of the end frames, whereby the blades are held at substantial angles to the axis of the wheel, said blades being foldable and being in turn connected to the same arms to which they are pivoted, so as to cause buckets to be formed, when the wheel is operated by the water from a dam.

5. In a water motor, a water propelled mechanism including a water wheel, a support for said mechanism, said water wheel having end frames, blades connected to certain corresponding opposite arms of the two end frames, and in turn detachably connected to certain other of the corresponding arms of the end frames, said blades comprising foldable sections adapting them to in turn connect to the same arm to which they are first connected, causing buckets to be formed.

In testimony whereof I hereunto affix my signature.

WILLIAM SMITH.